Feb. 26, 1957
R. G. FERRIS
2,782,900
CONVEYOR FLIGHT FOR CONTINUOUS CHAIN
TYPE BARN GUTTER CLEANERS
Filed Dec. 8, 1954
3 Sheets-Sheet 1
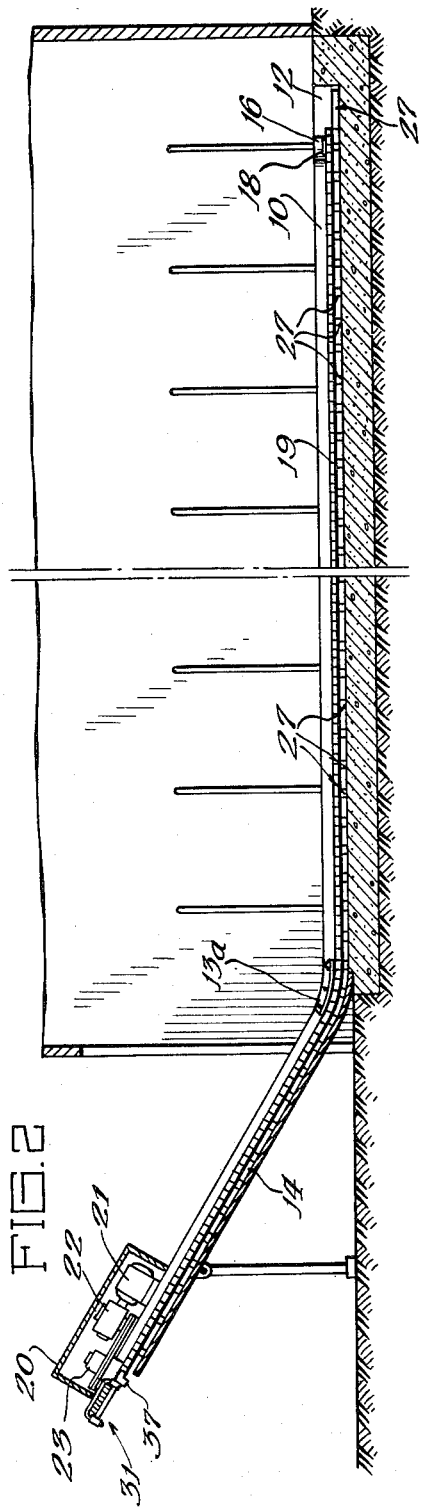
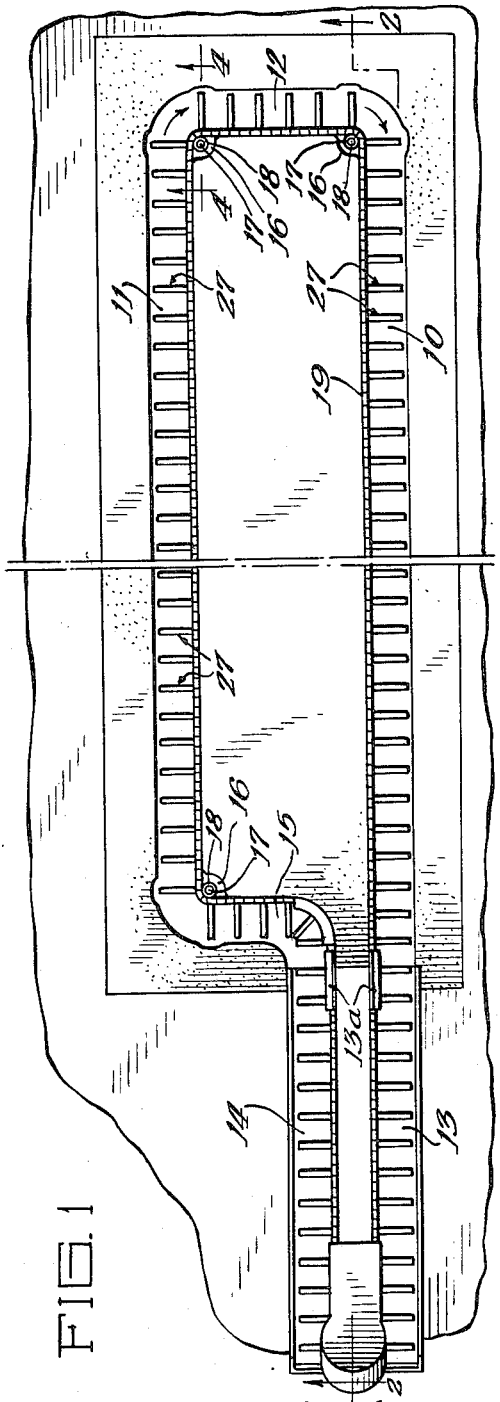
Inventor:
Robert G. Ferris
By: Schroeder, Hofgren,
Brady & Wegner
Attorneys Feb. 26, 1957
R. G. FERRIS
2,782,900
CONVEYOR FLIGHT FOR CONTINUOUS CHAIN
TYPE BARN GUTTER CLEANERS
Filed Dec. 8, 1954
3 Sheets-Sheet 2
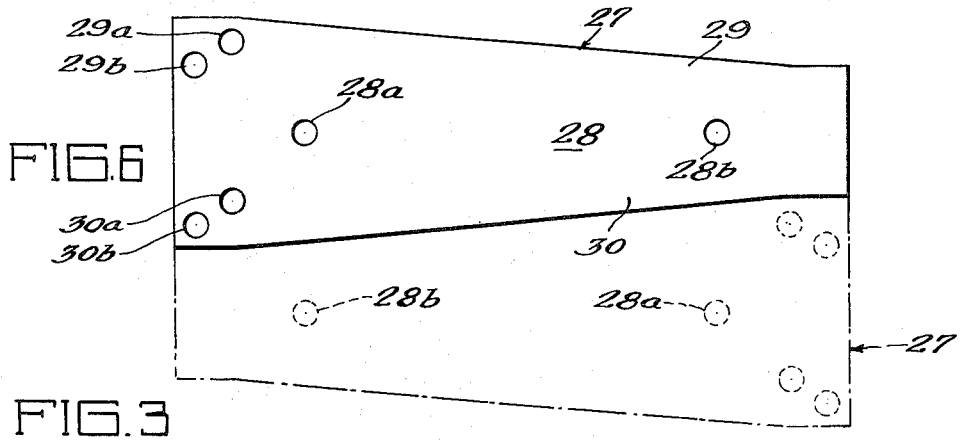
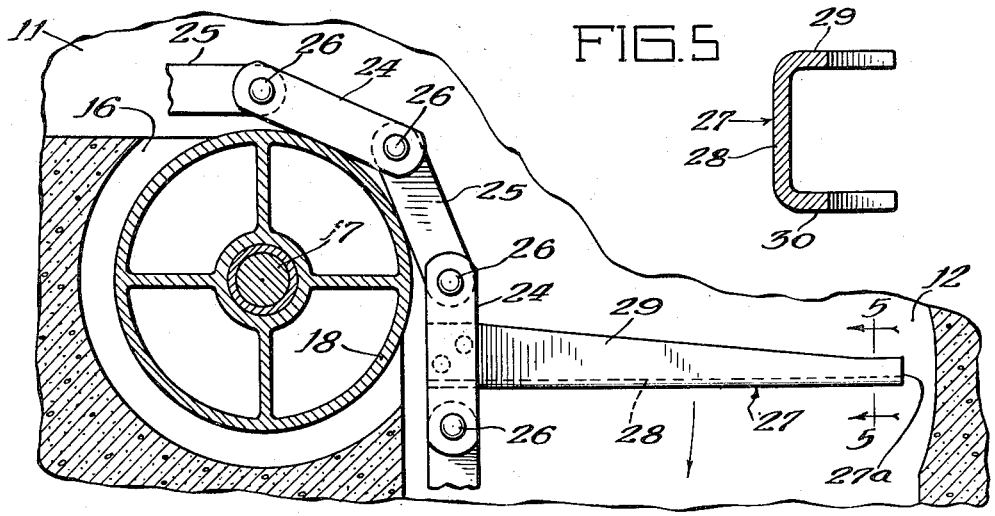
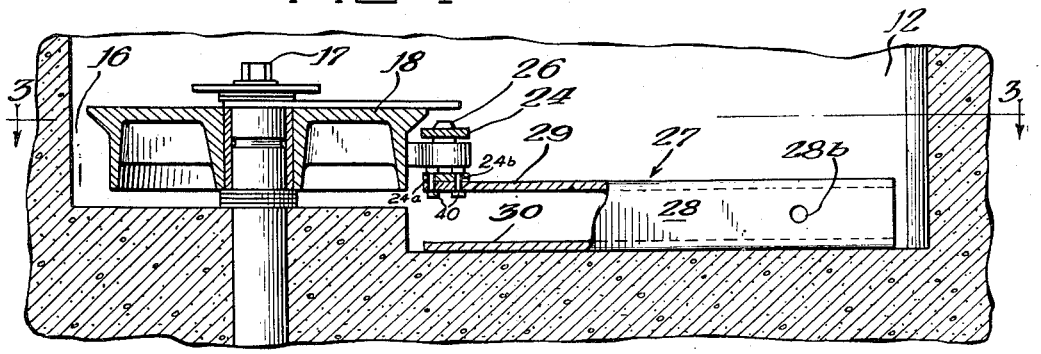
Inventor:
Robert G. Ferris
By: Schroeder, Hofgren,
Brady & Wegner
Attorneys

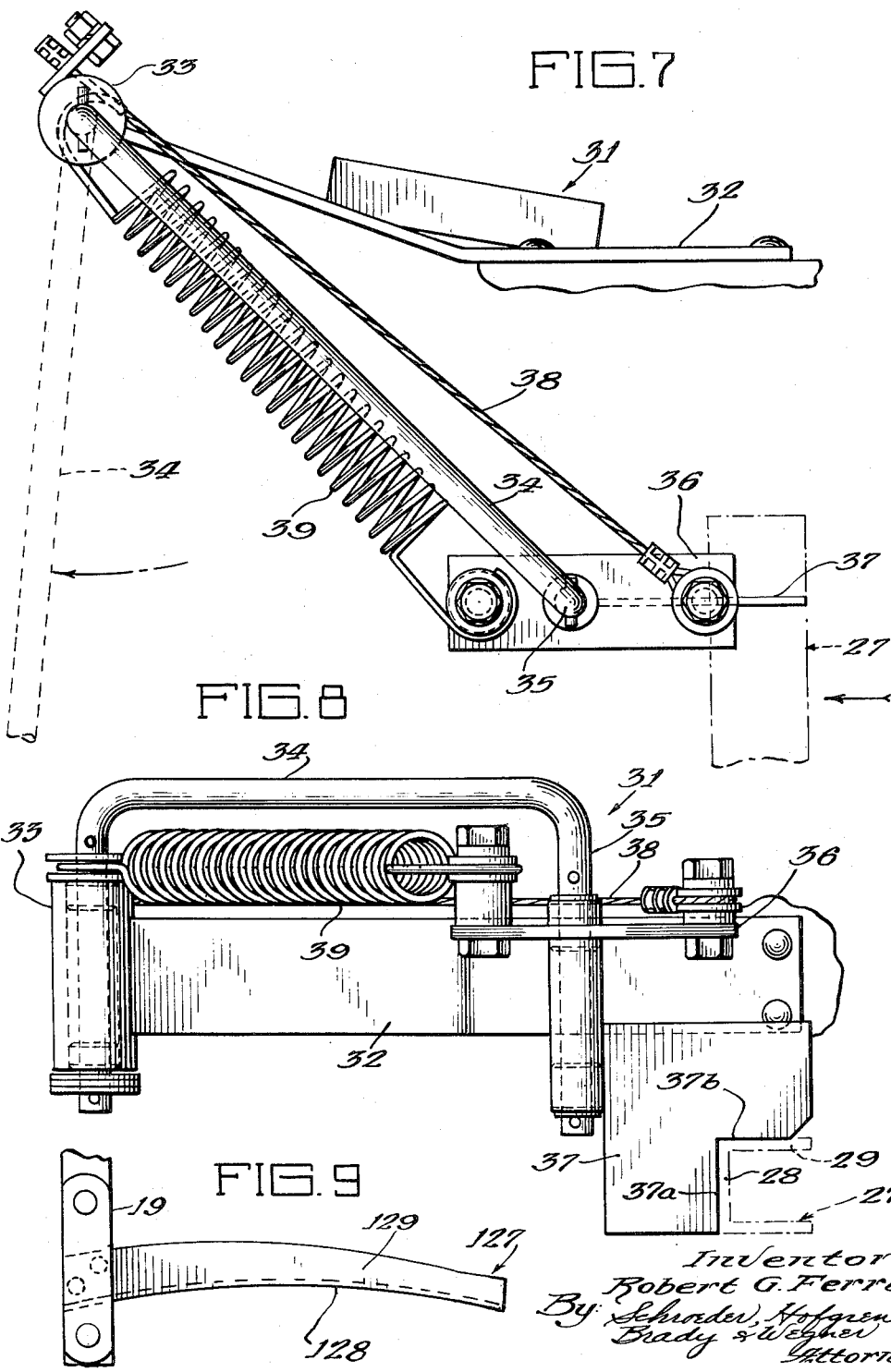

United States Patent Office

2,782,900
Patented Feb. 26, 1957

2,782,900

CONVEYOR FLIGHT FOR CONTINUOUS CHAIN TYPE BARN GUTTER CLEANERS

Robert G. Ferris, Harvard, Ill., assignor to Starline, Inc., a corporation of Illinois Application December 8, 1954, Serial No. 473,793

3 Claims. (Cl. 198—176)

This invention relates to an improved conveyor flight for continuous chain type barn gutter cleaners, and in particular it relates to a conveyor flight which is in the form of a channel iron.

The production of continuous chain type barn gutter cleaners requires a considerable amount of raw material. An average installation requires 225 feet of chain with a conveyor flight placed every 18 inches, or a total of 150 flights. Thus, anything which can be done to reduce the cost of flights can effect a substantial saving in the cost of the installation. Merely the handling of the material involved in fabrication is a substantial item. Thus, for example, a company manufacturing and selling 500 average cleaners annually will produce 75,000 flights, and anything which reduces the manufacturing operations and handling is very helpful in cutting cost.

The conventional flight for barn gutter cleaners heretofore employed has consisted of an angle member with a wear pad welded to the upright angle arm adjacent the point of attachment to the conveyor chain, so that the weight of the flight and adjacent portion of the chain is supported on the wear pad, which slides on the bottom of the barn gutter. The weight of the chain is such that the wear pads are essential for proper operation of the unit. The production of angle type flights with welded wear pads is relatively expensive because of the extra handling and the welding operation alone. Furthermore, since barn gutter cleaners must be made for different installations so that the conveyor chain may move either clockwise or counter-clockwise, the angle flights must be made either "right-handed" or "left-handed," depending upon the direction of the movement of the chain. Since there is no way of knowing in advance how many installations in any year will require right-hand flights and how many will require left-hand flights, it is obvious that a stock of flights of both kinds must be maintained at the factory, and at all distribution points, including the local dealers.

In accordance with the present invention, a universal conveyor flight is formed in the shape of a channel, and the flight has apertures in each of the two parallel channel legs so that it may be used either as a right-hand or as a left-hand flight by reversing the position of the parallel channel legs top and bottom. The upright web between the channel legs serves as the refuse moving element, and is positioned at the front of the flight so that refuse does not pack into the channel. The channel leg which is up in any given installation provides a mounting member; while the leg which is down supports the flights and the chain on the gutter floor so as to serve the function of a wear pad. Thus, the welding on of the wear pads is eliminated and there is no need for right and left-hand flights since the channel flights are universal.

The parallel legs of the channel member are tapered from their attaching end to their free end so as to reduce weight to a minimum. While there is a slight increase in the weight by the use of the channel flight, there is a substantial over-all cost saving because of the universal application of the channel flight, the elimination of welding and the fact that the channel flight may be blanked out of flat stock in a progressive die operation.

Another cost advantage which is of considerable interest is that the flights for three different standard widths of barn gutter cleaners may be blanked out of the same width stock. Standard widths are 13 inch, 15 inch, and 17 inch; and manufacturing experience shows that approximately 88% of production requires 15 inch flights, with the 13 inch and 17 inch representing about 6% each. Thus, 30 inch material may be used for all flights, being split into two 15 inch strips for the large share of production and into 13 inch and 17 inch strips for the remainder. Thus, since the flights are applicable to either clockwise or counter-clockwise rotating cleaners, the six different types of flights needed may all be manufactured from the 30 inch stock.

Cost estimates indicate that elimination of the welded wear pad alone will reduce the manufacturing cost per flight by a sufficient amount to result in a saving of about $30.00 per cleaner at the consumer level.

The invention is illustrated in a preferred embodiment in the accompanying drawings in which:

Fig. 1 is a plan view of a continuous type barn gutter installation;

Fig. 2 is a section taken as indicated along the line 2—2 of Fig. 1;

Fig. 3 is a fragmentary plan view, partly in section, at a corner of the gutter showing a channel type flight installed on a chain;

Fig. 4 is a section taken as indicated along the line 4—4 of Fig. 3;

Fig. 5 is an enlarged section taken as indicated along the line 5—5 of Fig. 3;

Fig. 6 is a plan view of two of the blanks for two flights, illustrating the nesting of flights to conserve material while blanking flights continuously from a strip;

Fig. 7 is a fragmentary section on a larger scale than Fig. 2 showing the flight cleaner at the upper end of the conveyor chute in plan;

Fig. 8 is a side elevational view of the flight cleaner; and

Fig. 9 is a plan view of a modified form of conveyor flight.

Referring to the drawings in greater detail, and referring first to Figs. 1 and 2, the gutter cleaner has an out-trough 10 and an in-trough 11 which is parallel to the out-trough, said parallel troughs being connected by a cross trough 12. At the outer end of the out-trough 10 there is an inclined conveyor chute 13, and parallel to the conveyor chute 13 is a return chute 14 which connects with the in-trough 11 by a short transverse trough section 15. At the inner corner of each intersection between a longitudinal trough and either the cross trough 12 or the transverse trough section 15 is an idler recess 16 provided with an upright spindle 17 on which is journalled an idler wheel 18; and a continuous conveyor chain 19 extends along the inner walls of the several troughs, along the adjacent faces of the inclined chutes 13 and 14, and is trained over the idler wheels 18 at the corners. An arcuate hold-down shoe 13a is positioned at the intersection of the trough 10 and chute 13. As best seen in Fig. 2, at the outer ends of the chutes 13 and 14 is a housing 20 having a drive motor 21 which operates through a transmission 22 to run a drive sprocket 23 by means of which the chain 19 is driven.

As best seen in Fig. 3, the chain 19 consists of open links 24 alternating with block links 25, all secured together by means of pins 26. A conveyor flight, indicated generally at 27, which is the subject of the present invention, is secured to every other link 24, and the length of the links is such that the flights 27 are approximately 18 inches apart.

Referring now particularly to Figs. 3 to 6, each conveyor flight 27 consists of a channel member having an upright web 28 and a pair of parallel legs 29 and 30 which lie at right angles to the upright web 28. The length of the flights 27 is such as to give appropriate clearance, such as ¾ inch, between the end of the flight and the outside gutter wall. Normally, such flights are produced in 13 inch, 15 inch, and 17 inch lengths, depending upon the width of the gutter with which they are to be used.

As best seen in Fig. 6, which illustrates a blank from which two channel-type flights 27 are fabricated, at one end the flight 27 is provided in the parallel legs 29 and 30 with staggered holes 29a and 29b and 30a and 30b, respectively, by means of which the flight may be bolted by bolts 40 to the bottom of an open chain link 24 which has matching apertures 24a and 24b. The positioning of the holes 29a and 29b differs slightly from the positioning of the holes 30a and 30b, in that the angle of the holes with respect to the upright web of the flight is reversed, and the angular disposition of the centers of the holes 29a and 29b differs slightly (by about 4°) with respect to the upright web from an angle through the centers of the holes 30a and 30b. The purpose of this difference in the positioning of the holes is to compensate for tolerances in the holes and bolts so that the flights stand at right angles to the chain when loaded whether they are on a conveyor chain which travels clockwise, as shown in Fig. 3, or whether they are mounted on a conveyor chain which travels counter-clockwise. To accomplish this purpose it is necessary that in each case a line through the centers of the holes in the leg form an angle to the flight web which is greater than the angle formed by a line through the centers of the apertures in the chain link with respect to a line normal to the link. Thus, a line through the apertures 24a and b is a 45° angle to a line normal to the link 24, while a line through the holes 29a and b or 30a and b is at a 47° angle to the upright web 28 of the flight.

It is necessary that the upright web 28 be at the front of the flight so that refuse will not pack into the channel opening when the conveyor is in use, and consequently when the flights are used with a counter-clockwise rotating conveyor, they are reversed from the position shown in Figs. 3 and 4—i. e., the leg 29 is at the bottom and the leg 30 receives the bolts 40 by which the flight is fastened to the chain link 24 through the apertures 24a and 24b and the holes 30a and 30b.

As best seen in Figs. 3 and 6, the parallel legs 29 and 30 taper from the area of the attaching holes to the outer end 27a of the flight. This makes the flight lighter than it would be if the legs 29 and 30 were the same width throughout.

The tapering of the flight from its fastening point to its outer end represents one of the most important improvements over the old angle-type flight. The channel-type flight has great strength where it is attached to the chain, and the tapering of the flight toward its free end gives it an ideal shape as a cantilever structural member. The strength of the flights is ample even though they are narrowed toward their outer ends, and the lightening of the outer end of the flight provides certain very definite operating advantages.

In the first place, as each flight travels around the drive sprocket 23, it is unsupported, as it has run off the end of the inclined chute 13 so as to drop refuse into a wagon box or other container. The right angle flights heretofore used, which are of uniform size throughout, tend to droop out of the plane of the conveyor chain, the outer ends being a substantial distance below the inner ends. The tapered construction of the channel flight lightens it so much at the free end portion that it has very little tendency to drop out of the plane of the drive sprocket.

This is important because of the fact that the conveyor flights must be scraped as they swing from the conveyor chute 13 to the return chute 14, so as to remove all of the litter from the flights and drop it into the wagon box. This is accomplished by a flight scraper assembly, indicated generally at 31, which is positioned as seen in Fig. 2 and the construction of which is shown in Figs. 7 and 8. The flight scraper assembly 31 includes a mounting bracket 32 which is secured between the chutes 13 and 14 adjacent the drive sprocket 23. At the outer end of the mounting bracket 32 is a pivot 33 for a scraper arm 34 which has an upright free end 35 to receive a pivotally mounted scraper blade bracket 36 on which is a scraper blade 37 which has perpendicularly opposed scraping surfaces 37a and 37b which ride, respectively, on the upright web 28 and the top leg 29 of a conveyor flight, as seen in Fig. 8. The scraper arm 34 is normally held in a rest position by means of a cable 38 and a return spring 39, and in the rest position of the arm 34 the scraper blade 37 is positioned as seen in Fig. 2, and is very close to the conveyor chain 19. As a conveyor flight 27 reaches the position occupied by the scraper blade 37 it engages the blade as seen in Fig. 8 and swings the scraper arm 34 about its pivot 33 against the tension of the return spring 39, as indicated by the broken line position of the arm 34 in Fig. 7. Thus, the opposed scraping edges 37a and 37b ride along the flight 27 as the flight swings around the arc between the chute 13 and the chute 14. Due to the relative positions of the center about which the conveyor chain 19 turns the corner, and the pivot 33 for the scraper arm 34, the scraper runs off the outer end of the conveyor flight 27 and is returned to its rest position by the spring 39.

From the foregoing description of the scraper assembly 31 it is clear that any drooping of the conveyor flight 27 as it is engaged with the scraper blade 37 will result in an unsatisfactory cleaning job because the upper arm 29 will droop away from the complementary scraping edge 37b.

It is thus apparent that the lightening of the outer end of the flight is of considerable importance in the proper cleaning of the flight.

A very important factor in efficiency of barn gutter cleaner operation is that overloading is likely to occur in the corners due to jamming of litter between the flight ends and the arcuate outer wall section, and also due to the increase in linear velocity of the outer end of a flight as it goes from the straight gutter section into the curve at the corner. The outer end of a flight accelerates from 15 feet a minute on the straightaway to 60 feet a minute going around a corner, and this is naturally a factor in increasing over-all power requirements.

With the tapered flight, mass is concentrated relatively close to the chain, and the outer portion of the flight is very much lighter than the corresponding portion of an angle flight. Thus, the tapered flight reduces the high energy loss occasioned by the acceleration and deceleration of the outer portions of the flights as they pass around a corner.

Another advantage of the tapered flight is that it reduces jamming of litter at the corners because its relatively small outer end punches through the litter much more readily than does a larger end, thus further reducing power losses during chordal rise of the flight.

Fig. 6 illustrates the manner in which the blanks for a series of flights 27 are reversed in a strip of raw stock so as to produce a large number of blanks with a minimum of waste. Thus, a large number of blanks may be cut from a single sheet of raw stock of appropriate width and substantial length with the only waste being the long narrow triangular sections of the sheet at each end of the entire series of flight blanks cut from one piece of stock, and the slugs from the holes.

As best seen in Fig. 4, the conveyor flight 27 rests upon the lower of the two parallel legs, which in the case of a clockwise rotating conveyor is the leg 30. This eliminates the need for a wear pad such as is necessary with a flight constructed from an angle member, and the area of flight surface which is on the bottom of the gutter is substantially larger than can be secured except with an inordinately large wear pad so that unit pressure is lower than is the case with welded on wear pads and wear on the bottom face which carries the weight of the flight and chain is thus less than is the case with an equivalent angle flight having a welded wear pad.

It will be noted in Figs. 4 and 6 that there is a pair of holes 28a and 28b on the median line of the flight. These holes are used in positioning the flight blanks in the forming and punching dies, and also furnish a convenient means for attaching a piece of plywood to the flight where the consistency of the refuse in the gutter is such that it has a tendency to push up and over the top of the conventional flight.

The modified conveyor flight 127 of Fig. 9 has a concave forward face 128. The point of greatest displacement from a straight line is at the median line of the flight, the two ends remaining in the same line. The curved flight has its forward face 128 curved on approximately a 38 inch radius for a 15 inch flight, so that the depth of the arc along the front face of the flight is about ¾ inch. This curvature may be modified somewhat—for example, the curvature may be ½ inch by using a 56½ inch radius on a 15 inch flight. It is not practical to use too short a radius because of the difficulty of getting the flight properly under the hold-down shoe 13a.

The channel-type flight adapts itself readily to a curved flight merely by making the forming die arcuate so as to stretch the upper leg 129 and the corresponding lower leg of the channel flight. It is not practical to produce a curved flight from angle stock because the attempt to curve angle stock invariably produces a roll or twist in the flight.

The principal advantage of the curved flight is that it tends to force the litter away from the side wall of the gutter and therefore tends to reduce side wall friction. The side wall friction with material of the type moved in a barn gutter is quite high because of the long lengths of straw and corn stalks included in the litter, which act as reinforcement and give the material a high angle of repose so that it acts totally differently than a granular substance as it is moved along a surface.

The foregoing detailed description is given for clearness of understanding only and no unnecessary limitations are to be understood therefrom, as some modifications will be obvious to those skilled in the art.

I claim:

1. In a barn gutter cleaner having a depressed gutter with upright sides and a flat bottom, and a continuous movable link chain mounted along one side wall of the gutter, said chain having a plurality of apertures in certain links, a conveyor flight comprising: a channel iron having spaced, parallel legs connected by an upright web, each of said legs having a plurality of holes in one of its end portions and said flight extending from the chain substantially entirely across the gutter; and depending fastening bolts extending through the apertures in a link of the chain and through the holes in a leg of said flight; whereby the flight is secured to the chain with said one leg abutting the underside of the chain and the other leg resting on the gutter floor to support the flight and chain.

2. The device of claim 1 in which a pair of holes in each leg of the flight is so positioned that a line through their centers forms an angle to the upright web of the flight which is greater than the angle formed by a line through the centers of the apertures in the link with respect to a line normal to the link, and the difference in said angles compensates for tolerances in the holes and bolts so that the flight under load is normal to the chain when either leg abuts the chain.

3. The device of claim 1 in which the holes in the legs are in the same respective end portions of said legs, and the legs taper from said end portions toward their opposite ends.

References Cited in the file of this patent

UNITED STATES PATENTS

| | | |
|---|---|---|
| 238,637 | Blevin | Mar. 8, 1881 |
| 877,210 | Martin et al | Jan. 21, 1908 |
| 1,182,458 | Coleman | May 9, 1916 |
| 1,420,207 | Moody | June 20, 1922 |
| 1,583,614 | Smith | May 4, 1926 |
| 1,665,373 | Lamb | Apr. 10, 1928 |
| 2,017,005 | Levin | Oct. 8, 1935 |
| 2,544,191 | Tomfohrde | Mar. 6, 1951 |
| 2,676,696 | Gerhartz | Apr. 27, 1954 |